(12) United States Patent
Linam et al.

(10) Patent No.: US 6,401,218 B1
(45) Date of Patent: Jun. 4, 2002

(54) METHOD AND SYSTEM FOR FUNCTIONAL KERNEL VERIFICATION TESTING WITHIN A DATA PROCESSING SYSTEM

(75) Inventors: Stephen Dale Linam; Bruce Gerard Mealey, both of Austin; Randal Craig Swanberg, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/249,993

(22) Filed: Feb. 16, 1999

(51) Int. Cl.[7] .............................................. G06F 11/36
(52) U.S. Cl. ............................................ 714/25; 714/36
(58) Field of Search ................... 714/25, 36; 717/11; 713/1, 2; 709/222; 710/10, 104; 712/227

(56) References Cited

U.S. PATENT DOCUMENTS

| | | | |
|---|---|---|---|
| 5,426,775 A | * | 6/1995 | Boccon-Gibod |
| 5,640,562 A | * | 6/1997 | Wold et al. |
| 5,732,268 A | * | 3/1998 | Bizzarri |
| 5,978,912 A | * | 11/1999 | Rakavy et al. |

* cited by examiner

Primary Examiner—Gopal C. Ray
(74) Attorney, Agent, or Firm—Volel Emile; Bracewell & Patterson, L.L.P.

(57) ABSTRACT

A method and system for functional kernel verification testing within a data processing system is described. The method and system of the present invention performs imbedded functional verification test suites on selected kernel components within the data processing system when system administrator kernel component power-on self tests are required during an operating system boot operation. When an error is detected during the imbedded functional verification testing for a selected kernel component, it is reported based on the severity level. For a low or minor functional error, a warning is sent to the user and for a high or major functional error, the data processing system is immediately halted and a service call is generated. Additionally, to correct for the functional error, the data processing system may be enabled to de-install the most recent update of the kernel component. The data processing system may also be enabled to search for, download and apply auto-install fixes for a kernel component that a functional error has been detected. Also, the data processing system may be enabled to place an automated service call for flagging the functional error for the kernel component. After every fix, the data processing system is rebooted and the procedure begins again.

20 Claims, 3 Drawing Sheets

METHOD AND SYSTEM FOR FUNCTIONAL KERNEL VERIFICATION TESTING WITHIN A DATA PROCESSING SYSTEM

BACKGROUND OF THE INVENTION

1. Technical Field

The present invention relates to a method and system for data processing or information handling systems in general and, in particular, to a method and system for performing functional kernel verification testing during an operating system boot operation in a computer system. Still more particularly, the present invention relates to a method and system for reporting and placing service calls when functional errors are detected for the selected kernel components under test. Additionally, the present invention may de-install the latest update or search for, download and apply a fix when a functional error is detected for the selected kernel component under test.

2. Description of the Prior Art

Due to today's rapidly changing development environment in complex server systems or multi-processor system designs, the various permutations of selective fixes to an operating system make it difficult to run functional verification tests on every possibly design permutation. Also in a development environment, there might be wasted test effort when operating system levels are released, since they may have not yet undergone basic functional verification testing until after the release of the development level. Therefore, maintaining system integrity and determining when the system has problems are important requirements.

Therefore, there is a need for integrating kernel functional verification testing as a part of the operating system boot process to help keep pace with the development cycle. It would also be desirable that when new hardware and firmware components are added an initialized, an internal/integrated functional verification test be performed to detect and correct error conditions early in the development cycle. The subject invention herein solves all of these problems in a new and unique manner that has not been part of the art previously.

SUMMARY OF THE INVENTION

In view of the foregoing, it is therefore an object of the present invention to provide an improved method and system for performing functional kernel verification tests during an operating system boot operation in a computer system or information handling system.

It is another object of the present invention to provide an improved method and system for successfully executing kernel functional verification tests when a computer system is booted after every development build.

It is yet another object of the present invention to provide an improved method and system for de-installing or searching for, downloading and applying a fix when a functional error is detected for a selected kernel component under test in a computer system or information handling system and placing an automatic service call.

The foregoing objects are achieved is now described. The method and system of the present invention performs imbedded functional verification test suites on selected kernel components within a data processing system when system administrator kernel component power-on self tests are required during an operating system boot operation. When an error is detected during the imbedded functional verification testing for a selected kernel component it is reported based on the severity level. For a low or minor functional error a warning is sent to a system administrator and for a high or major functional error the data processing system is immediately halted and a service call is generated. Additionally, to correct for the functional error the data processing system may be enable to de-install the most recent update of the kernel component. The data processing system may also be enabled to search for, download and apply auto-install fixes for a kernel component that a functional error has been detected. Also, the data processing system may be enabled to place an automated service call for flagging the functional error for the kernel component. After every fix the data processing system is rebooted and the procedure begins again.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF A PREFERRED EMBODIMENT

The present invention may be executed in a variety of computer systems under a number of different operating systems or information handling systems. In addition, the computer system may be a stand-alone system or part of a network such as a local-area network (LAN) or a wide-area network (WAN). For the purpose of illustration, a preferred embodiment of the present invention, as described below, is implemented on server business computers, such as the RS/6000 model S70, manufactured by International Business Machines Corporation.

Figure 1:
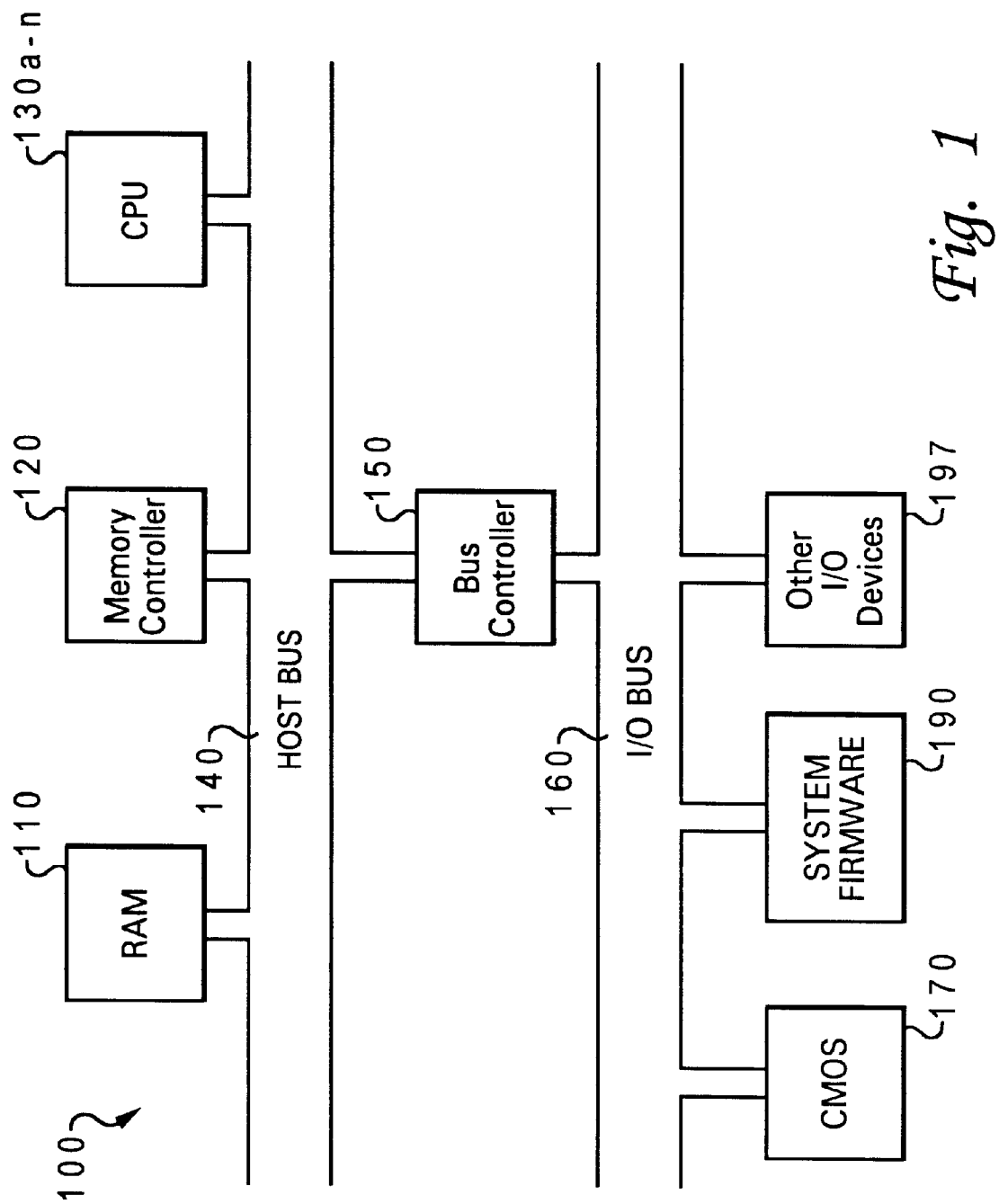
FIG. 1 is a system block diagram of a symmetrical multi-processing system, which may be utilized in conjunction with a preferred embodiment of the present invention.

Referring now to the drawings and in particular to FIG. 1, there is depicted a system block diagram of a typical symmetrical multi-processing system 100 which may be utilized in conjunction with a preferred embodiment of the present invention. As shown, multiple central processing units (CPUs) 130a to 130n are connected to system RAM 110 via a memory controller 120 and host bus 140. The multiple central processing units (CPUs) 130a to 130n are further connected to other hardware devices via host bus 140, bus controller 150, and I/O bus 160. These other hardware devices include, for example, system firmware Read-Only Memory (ROM) 190, a nonvolatile storage device, such as CMOS 170, as well as other I/O devices, including for example, a keyboard, display, mouse, joystick, or the like, all of which are collectively designated by reference numeral 197.

(It will be appreciated by those of ordinary skill of course, that references to the performance of method steps by computer software actually mean that a computer, or one of its components, is performing the method steps in response to the instructions encoded in the computer software.)

Figure 2:
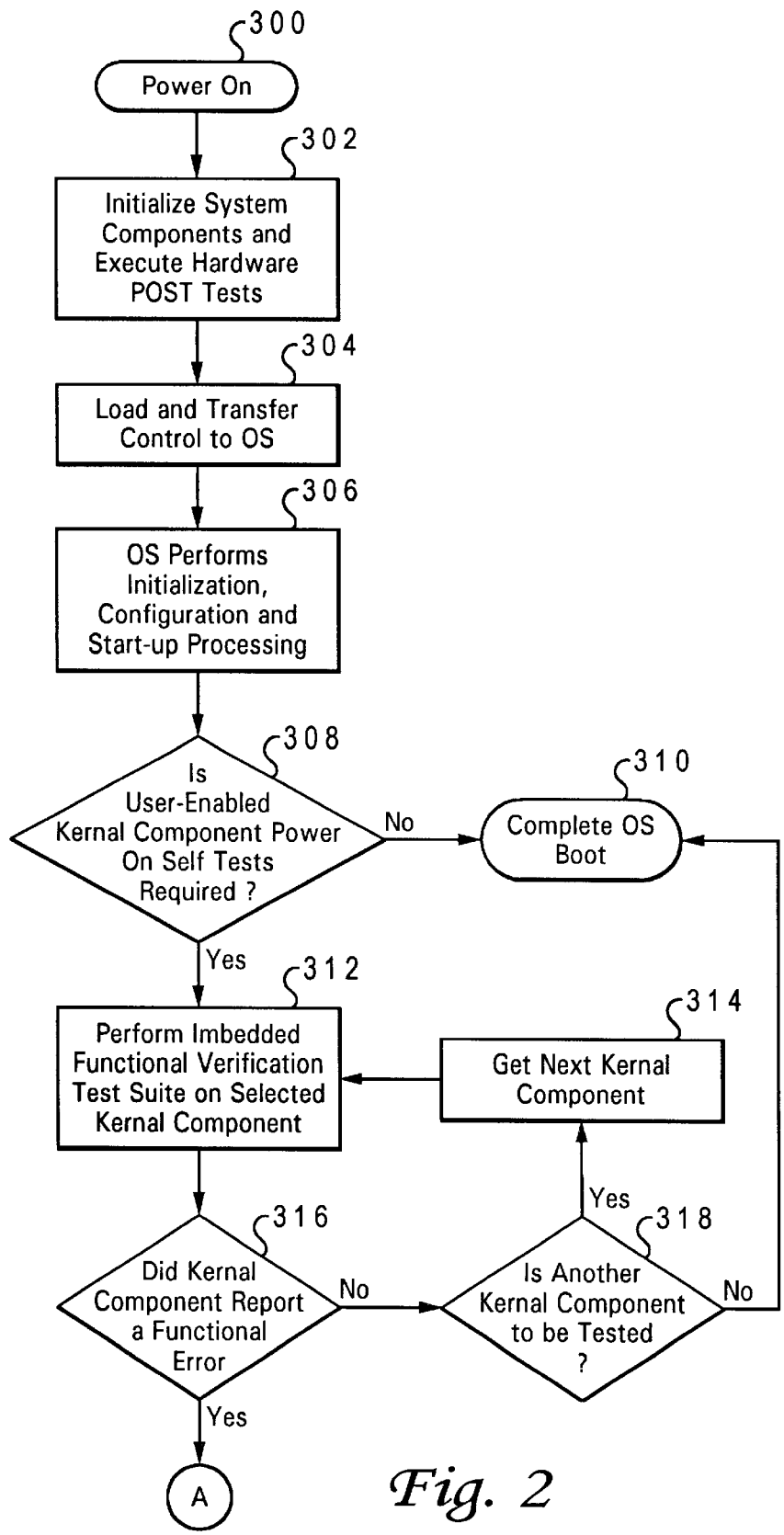
FIG. 2 is a flow chart depicting a typical symmetrical multi-processing system boot process in accordance with the teachings of this invention.

Referring now to FIG. 2, there is depicted a flow chart showing a symmetrical multi-processing system boot process in accordance with the teachings of the present invention. The system is first powered on as shown in step 300, which initializes the system components and executes the hardware post tests as shown in step 302. Next, in step 304, the operating system (hereinafter OS) boot is loaded and transferred to the OS. The OS then performs initialization, configuration and start-up processing as is well known in the art for booting data processing systems and shown in step 306.

Referring once again to FIG. 2, step 308, shows the initialization of the process in accordance with a preferred embodiment of the present invention and determines if system administrator enabled kernel component power-on self tests are required during the operating system boot operation. If no system administrator enabled power-on self tests are required, the process ends by completing the OS system boot, as shown in step 310. If system administrator enabled power-on self tests are required, the process proceeds to step 312 wherein imbedded verification test suites on selected kernel components in a sequential predetermined order are now performed.

As shown in step 316, the process determines if a functional error has been reported for the first or next kernel component that was undergoing functional verification testing. If no error was reported the process proceeds to step 318 to determine if another kernel component is to be tested. If no more kernel components are to be tested, the process once again ends by completing the OS system boot, as shown in step 310. If one or more kernel components are to be tested the process gets the next sequentially ordered kernel components, as shown in step 314 and proceeds to step 312 to once again perform the imbedded functional verification tests until all tests have been exhausted. However, if an error is reported for selected kernel components, the process proceeds to step 320, as shown in FIG. 3.

Figure 3:
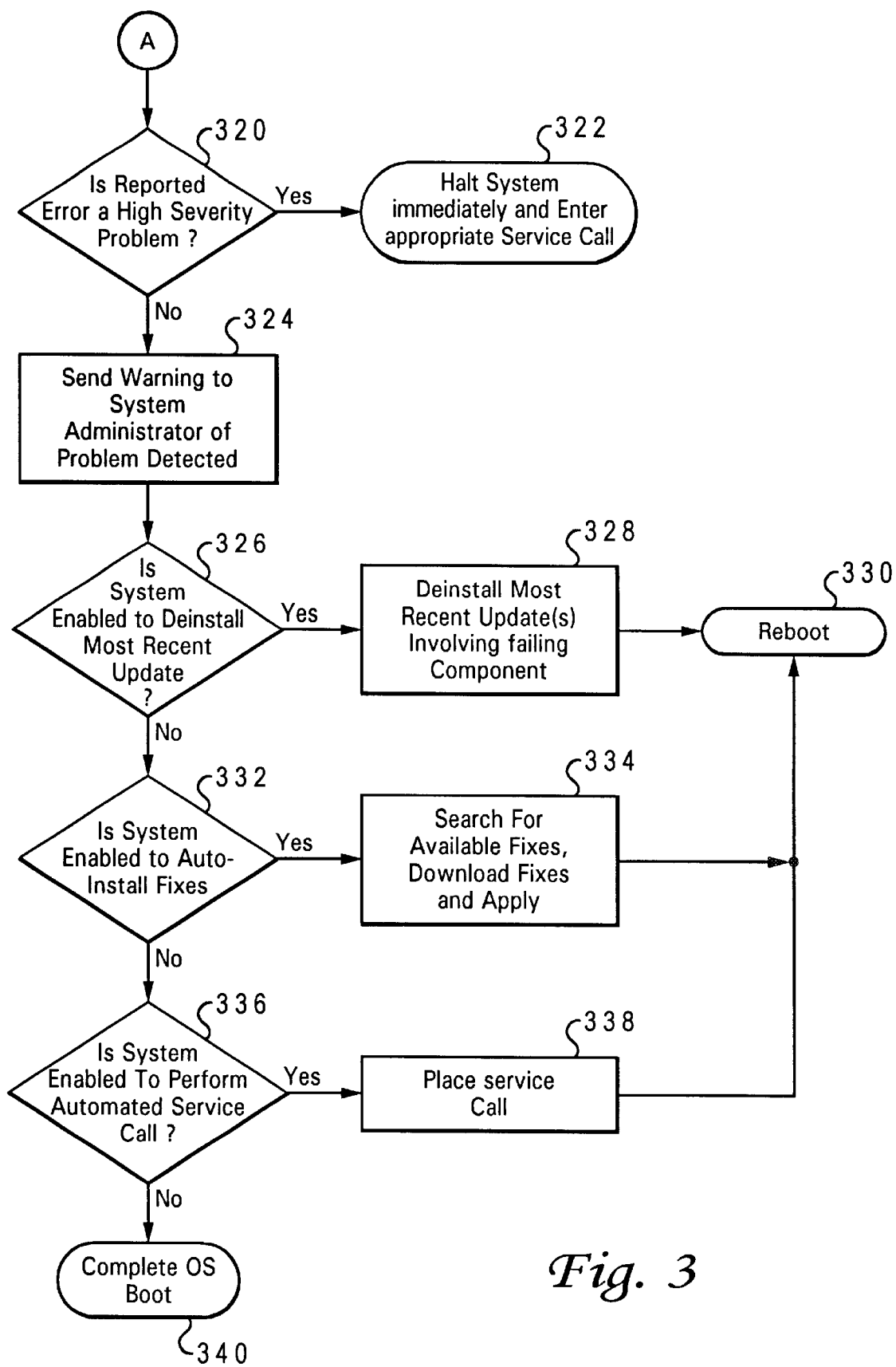
FIG. 3 is a high-level logic flow diagram of a method for dynamically selecting a boot process when a power-on request is received by a computer system within a network environment, in accordance with a preferred embodiment of the present invention.

Referring now to FIG. 3 and continuing the process in accordance with a preferred embodiment of the present invention, the severity level of the reported error is determined in step 320. If the severity level is high, the system is halted immediately to prevent damage to the hardware and/or customer data and the appropriate service call is entered, as shown in step 322. If, however, the severity level is low, the process proceeds to step 324 for sending a warning to the system administrator that a problem has been detected and needs future servicing. Next, the system is checked in step 326 to see if the system has been enabled to de-install the most recent update of the kernel component that the error was reported for. As shown in step 328, the kernel component is de-installed if the system is enabled to do so and rebooted in step 330 to restart the process over again.

Turning once again to FIG. 3, the process if not enabled to de-install the faulty kernel component is checked to see if the system has been enabled to auto-install the fixes. If the system has been so enabled, the system proceeds to go to a server or Internet connection to search a library or database for the available fix that might relate to the problem symptom. If the available fix is found, it is downloaded and applied to the kernel component for which the error was reported, as shown in step 334. The system is then rebooted at step 330 and the process begins over again. If, however, the system is not enabled to auto-install fixes, it is lastly checked in step 336 to see if it can perform or make an automated service call. If so enabled a service call is placed in step 338 and the system is rebooted in step 330. If the system has no way to place a call, de-install the component or perform an auto-install fix, then the reported error to the system administrator is relied upon to fix the error condition and the system completes the OS boot in step 340 thus ending the process.

Functional Verification (FV) testing is intended to fully test the functionality of all interfaces provided by a particular component to other components and users. The interfaces to be tested include, but are not limited to:

calling interfaces: application programming interfaces (APIs), kernel exports and command line parameters.

global state changes: side effects on global data structures, side effects on thread, process, or systems state, exported global variables and environment variables.

output: return values, modified reference parameters, error messages, translated error messages, output files, command output and device output.

By way of example, but not of limitation, the following types of testing that should be done include, but are not limited to:

simple list of inputs
boundary values for inputs
combinations of inputs
invalid inputs
order of execution of different
interaction between different interfaces
special or odd conditions, including error injection, preemption, faults, etc.

In accordance with the present invention, the following criteria may be used for determining successful test execution:

successful operation
standards conformance
secure operation
termination of execution
claims satisfied
results match external documentation
reliable (consistent) operation The method of the present invention may be used for example in operating system Kernel Development and bring-up. As each new function is added to a operating system kernel, a test suite is also added and executed as part of the system boot. This helps regulate the stability of each added function and provides a verification of existing functions with each new level. Applying the method of the present invention to AIX products may allow every customer environment the ability to fully functionally verify their permutation of the AIX operating system, uniquely populated in their environment with certain configurations, updates and fixes.

Applying the method of the present invention in the development lab will mean that every development build will have successfully executed kernel functional verification test once it has booted. At the product level, this may be an optional feature that a customer specifically before or after installing product updates and/or selective fixes enable from the command line, for the next boot, or from an Open Firmware menu as a command line option to the "boot" command. In the development lab, it may be automatically enabled for development builds prior to the "ship-test" portion of the development cycle.

It is also important to note that although the present invention has been described in the context of a fully functional kernel verification test suite in hardware, those skilled in the art will appreciate that the mechanisms of the present invention are capable of being distributed as a program product in a variety of forms to any type of information handling system, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for functional kernel verification testing within a data processing system, said method comprising the steps of:

initializing an operating system boot operation within a data processing system;

determining if system administrator kernel component power-on self tests are required during said operating system boot operation;

responsive to determining that said system administrator kernel component power-on self tests are required, performing imbedded functional verification test suites on selected kernel components within said data processing system; and completing said operating system boot operation.

2. The method for functional kernel verification testing within a data processing system according to claim 1, wherein said step of performing imbedded functional verification test suites on selected kernel components further includes:

determining if a functional error occurred during imbedded functional verification testing on a selected kernel component; and responsive to determining that a functional error occurred, reporting said functional error for said selected kernel component based on a severity level of said functional error.

3. The method for functional kernel verification testing within a data processing system according to claim 2, wherein said step of reporting said functional error based on said functional error's severity level further includes sending a warning to a system administrator when said severity level of said functional error is low.

4. The method for functional kernel verification testing within a data processing system according to claim 2, wherein said step of reporting said functional error based on said functional error's severity level further includes immediately halting said data processing system and entering a service call when said severity level of said functional error is high.

5. The method for functional kernel verification testing within a data processing system according to claim 4, wherein responsive to determining that said functional error occurred for said selected kernel component further includes:

determining if said data processing system is enabled to de-install most recent update of said kernel component; and responsive to determining that said data processing system is enabled, de-installing most recent update of said kernel component and rebooting said data processing system.

6. The method for functional kernel verification testing within a data processing system according to claim 4, wherein responsive to determining that said functional error occurred for said selected kernel component further includes:

determining if said data processing system is enabled to auto-install fixes for said kernel component; and responsive to determining that said data processing system is enabled to auto-install fixes, search, download and apply said auto-install fixes for said kernel component and rebooting said data processing system.

7. The method for functional kernel verification testing within a data processing system according to claim 4, wherein responsive to determining that said functional error occurred for said selected kernel component further includes:

determining if said data processing system is enabled to perform automated service calls for said kernel component; and responsive to determining that said data processing system is enabled to perform automated service calls, placing said service call for said kernel component and rebooting said data processing system.

8. An information handling system comprising:

means for initializing an operating system boot operation within a data processing system;

means for determining if system administrator kernel component power-on self tests are required during said operating system boot operation;

means for performing imbedded functional verification test suites on selected kernel components within said data processing system when said system administrator kernel component power-on self tests are required; and means for completing said operating system boot operation.

9. The information handling system according to claim 8, wherein said means for performing imbedded functional verification test suites on selected kernel components further includes:

means for determining if a functional error occurred during imbedded functional verification testing on a selected kernel component; and means for reporting said functional error for said selected kernel component based on a severity level of a function when said functional error occurs.

10. The information handling system according to claim 9, wherein said means for reporting said functional error based on said functional error's severity level further includes means for sending a warning to a system administrator when said severity level of said functional error is low.

11. The information handling system according to claim 9, wherein said means for reporting said functional error based on said functional error's severity level further includes means for immediately halting said data processing system and entering a service call when said severity level of said functional error is high.

12. The information handling system according to claim 9, wherein when said functional error occurs for said selected kernel component further includes: means for determining if said data processing system is enabled to de-install most recent update of said kernel component; and means for de-installing most recent update of said kernel component and rebooting said data processing system when said data processing system is enabled.

13. The information handling system according to claim 9, wherein when said functional error occurs for said selected kernel component further includes:
- means for determining if said data processing system is enabled to auto-install fixes for said kernel component; and
- means for searching, downloading and applying said auto-install fixes for said kernel component when said data processing system is enabled to auto-install fixes and rebooting said data processing system.

14. The information handling system according to claim 9, wherein when said functional error occurs for said selected kernel component further includes:
- means for determining if said data processing system is enabled to perform automated service calls for said kernel component; and
- means for placing said service call for said kernel component when said data processing system is enabled to perform automated service calls and rebooting said data processing system.

15. A computer program product residing on a computer usable medium for functional kernel verification testing within an information handling system, comprising:
- instruction means for initializing an operating system boot operation within a data processing system;
- instruction means for determining if system administrator kernel component power-on self tests are required during said operating system boot operation;
- instruction means for performing imbedded functional verification test suites on selected kernel components within said data processing system when said system administrator kernel component power-on self tests are required; and
- instruction means for completing said operating system boot operation.

16. A computer program product according to claim 15, wherein said instruction means for performing imbedded functional verification test suites on selected kernel components further includes:
- instruction means for determining if a functional error occurred during imbedded functional verification testing on a selected kernel component; and
- instruction means for reporting said functional error for said selected kernel component based on a severity level of a function when said functional error occurs.

17. A computer program product according to claim 16, wherein said instruction means for reporting said functional error based on said functional error's severity level further includes instruction means for sending a warning to a user when said severity level of said functional error is low and instruction means for immediately halting said data processing system and entering a service call when said severity level of said functional error is high.

18. A computer program product according to claim 16, wherein when said functional error occurs for said selected kernel component further includes:
- instruction means for determining if said data processing system is enabled to de-install most recent update of said kernel component; and
- instruction means for de-installing most recent update of said kernel component and rebooting said data processing system when said data processing system is enabled.

19. A computer program product according to claim 16, wherein when said functional error occurs for said selected kernel component further includes:
- instruction means for determining if said data processing system is enabled to auto-install fixes for said kernel component; and
- instruction means for searching, downloading and applying said auto-install fixes for said kernel component when said data processing system is enabled to auto-install fixes and rebooting said data processing system.

20. The information handling system according to claim 16, wherein when said functional error occurs for said selected kernel component further includes:
- instruction means for determining if said data processing is enabled to perform automated service calls for said kernel component; and
- instruction means for placing said service call for said kernel component when said data processing system is enabled to perform automated service calls and rebooting said data processing system.

* * * * *